United States Patent [19]
Colaianna et al.

[11] Patent Number: 5,883,177
[45] Date of Patent: Mar. 16, 1999

[54] AMORPHOUS PERFLUOROPOLYMERS

[75] Inventors: Pasqua Colaianna; Giulio Brinati, both of Milan; Vincenzo Arcella, Novara, all of Italy

[73] Assignee: Ausimont S.p.A., Milan, Italy

[21] Appl. No.: 845,145

[22] Filed: Apr. 21, 1997

[30] Foreign Application Priority Data

Apr. 24, 1996 [IT] Italy ............................ MI96 A 000816

[51] Int. Cl.⁶ ........................................................ C08K 5/02
[52] U.S. Cl. ............................................ 524/462; 526/247
[58] Field of Search ............................... 524/462; 526/247

[56] References Cited

U.S. PATENT DOCUMENTS

| | | |
|---|---|---|
| 2,242,218 | 5/1941 | Auer . |
| 3,665,041 | 5/1972 | Sianesi et al. . |
| 3,715,378 | 2/1973 | Sianesi et al. . |
| 3,865,845 | 2/1975 | Resnick . |
| 4,594,399 | 6/1986 | Anderson et al. . |
| 4,864,006 | 9/1989 | Giannetti et al. . |
| 4,954,271 | 9/1990 | Green . |
| 5,498,682 | 3/1996 | Navarrini et al. . |

FOREIGN PATENT DOCUMENTS

| | | |
|---|---|---|
| A073087 | 3/1983 | European Pat. Off. . |
| A080187 | 6/1983 | European Pat. Off. . |
| A095077 | 11/1983 | European Pat. Off. . |
| A148482 | 7/1985 | European Pat. Off. . |
| A239123 | 9/1987 | European Pat. Off. . |
| A0460523 | 12/1991 | European Pat. Off. . |
| A0633257 | 1/1995 | European Pat. Off. . |
| A0645406 | 3/1995 | European Pat. Off. . |
| A645406 | 3/1995 | European Pat. Off. . |
| A0720992 | 7/1996 | European Pat. Off. . |
| 9507306 | 3/1995 | WIPO . |
| 9526218 | 10/1995 | WIPO . |

OTHER PUBLICATIONS

Macromolecular Symp. 82, 61–65 (1994).
W.H. Buck, P.R. Resnick, Technical Information "Properties of Amorphous Fluoropolymers Based on 2,2–Bistrifluoromethyl–4,5–Difluoro–1, 3–Dioxole" 183$^{rd}$ Meeting of the Electromechanical Society Honolulu, HI, May 17, 1993, pp. 1–11.

*Primary Examiner*—Bernard Lipman
*Assistant Examiner*—N. Sarofim
*Attorney, Agent, or Firm*—Nikaido Marmelstein Murray & Oram, LLP

[57] ABSTRACT

Use of amorphous perfluoropolymers based on homopolymers of the TTD dioxole or its amorphous copolymers to prepare solutions in fluoro-containing solvents, to obtain solutions for coatings, wherein TTD has the formula:

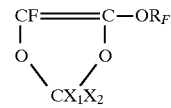

wherein $R_F$ is a perfluoroalkylic radical with 1–5 carbon atoms, linear or branched when possible; $X_1$ and $X_2$ equal to or different from each other being F or $CF_3$; the TTD amount ranges from 40 to 100% by moles.

10 Claims, No Drawings

AMORPHOUS PERFLUOROPOLYMERS

The present invention relates to amorphous polymers based on fluoro-containing monomers utilizable in particular for coatings. More specifically we refer to homopolymers or copolymers having a solubility in fluoro-containing solvents, being preferably also ozone-friendly (low ODP) and having also a low impact on global warming (GWP), of at least 15% by weight, more preferably higher than 20% by weight, combined with good mechanical properties.

It is well known that in applications for coatings it is desirable that the polymeric concentration in the solvent is as high as possible. This leads to operate with less amount of solvent and therefore with reduced problems of recovery and of environmental impact.

Moreover the solvents to be utilized must not be toxic and must have preferably the characteristics indicated above since the laws of the various countries have banned the use of most solvents, utilized up to now, owing to problems of ozone impact.

As examples of solvents which cannot be longer utilized for their impact on the ozone, chloro-containing solvents, chlorofluorocarbons (CFC) can be mentioned. In particular CFC 113 ($CCl_2F$-$CClF_2$), usually employed as a solvent to prepare solutions for coatings, cannot be utilized any longer.

More particularly, the invention relates to perfluoropolymers which, as well known, can be crystalline or amorphous. The crystalline polymers are characterized by an high thermal stability and an high chemical resistance. However these polymers result unsoluble in any solvent at room temperature, therefore they cannot be utilized to prepare solutions for coatings. Moreover these crystalline polymers are characterized by low optical properties since the presence of crystallites gives rise to light scattering.

Amorphous perfluoropolymers can be subdivided in two classes: those which have a transition temperature Tg lower than room temperature and those having a Tg temperature higher than room temperature. The former need a crosslinking to confer to the material the required mechanical properties that a coating must have.

The latter are at the glass state up to the Tg of the material and therefore have mechanical properties up to the Tg of the material without the need of any crosslinking.

The present invention refers to this last group of amorphous perfluoropolymers.

Amorphous perfluoropolymers of this class are known in the art, see for intance U.S. Pat. No. 3,865,845, wherein homopolymers of a specific dioxole, i.e. perfluoro-2,2-dimethyl-1,3-dioxole (PDD) and PDD copolymers with tetrafluoroethylene (TFE) are described. In this patent PDD homopolymers and crystalline copolymers having a melting point of 265° C. are exemplified. The crystalline copolymers have been obtained by utilizing amounts lower than 12% by moles of PDD. It is well known, according to the teaching of the patent, that copolymers between PDD/TFE with any ratio of the two monomers, can be prepared. In the patent it is stated that the examples are given only for illustrative purposes, but the skilled in the art is capable of carrying out various other examples to prepare the copolymers with various PDD/TFE ratios. In particular the skilled can prepare crystalline and amorphous copolymers also with the absence of residual crystallinity so as to obtain a product with good optical properties. In the description indeed it is stated that the homopolymers and copolymers of the invention can be utilized for cast into films, i.e. to prepare solutions for coating.

The solubility in ozone-friendly solvents, for instance FLUORINERT® FC 75, results low and much lower than the limits indicated above, as reported in patent WO 95/07306 described further on.

In patent EP 73087, PDD/TFE copolymers are described wherein TFE can range from 1 to 99% by weight. In pratice this patent characterizes the copolymers already described in the previous patent. It is stated that if the PDD amount is lower than 11% by moles, crystalline copolymers are obtained, moreover different Tg are obtained depending on the PDD amount. For instance with 11.2% by moles of PDD there is a Tg of 57° C., while with 56.9% there is a Tg of 119° C. As to the solubility, the considerations made for the previous patent are valid.

In patent EP 645406 further characterization data are given and it is stated that the amorphous copolymers of PDD are soluble in FLUORINERT® FC 75 produced by 3M Company (perfluoro(n-butyl-tetrahydrofurane)), wherefore the copolymers are particularly suitable for coatings. A 5% solution of a copolymer with a PDD content of 72% by moles, is exemplified. The amorphous copolymers which have a combination of optimal properties have a PDD content ranging from 65 to 99% by moles. Also in this case the solubilities in the exemplified solvent are very low.

From U.S. Pat. No. 4,594,399 are known TFE homopolymes and copolymers with another specific dioxole wherein the carbon linked to the oxygen atoms, instead of two perfluoroalkylic groups $C_1$–$C_4$, considers the case in which one of these groups is F or Cl. It is stated in the patent that said homopolymers and copolymers can be utilized to prepare solutions for coatings. The solubility values in the solvents mentioned below are not given.

Moreover it is known from patent EP 80187 a dioxole (PD) having the two carbon valences bound to the oxygen saturated with two fluorine atoms. Crystalline and amorphous copolymers of this specific dioxole are described, the latter are obtained when the PD amount is higher than 12% by moles. Coatings with solutions in FC 75, having copolymeric concentrations of about 3% by weight, are described.

From patent EP 95077 fluorodioxoles are known wherein at least an hydrogen or chlorine atom is present on the carbon in the double bond. It is stated in the description that amorphous copolymers are soluble in FC 75 and therefore utilizable for coatings. Experimental data of solubility are not reported.

In patent WO 95/07306 functional fluoropolymers are described which are obtained by the use of functional monomers introduced in PDD-based homopolymers or copolymers. The amounts of the functional monomer preferably range from 0.5 to 5% by moles. This functional monomer has the purpose to increase the solubility since the PDD amorphous copolymers, in particular with TFE, have a low solubility. In particular the solubility is 2% by weight when PDD is present in amounts of about 95% by moles; if the PDD amount is 65% by moles the solubility in FC 75 is 10% by weight. With the addition of the functional monomer, the solubility is slightly increased.

The Applicant has surprisingly and unexpectedly found a particular and specific class of amorphous perfluoropolymers based on a particular and specific dioxole having a high solubility in the solvents as defined above, for instance FC 75, without utilizing additional functional monomers.

An object of the present invention is the employment of homopolymers of the TTD dioxole or its amorphous copolymers to prepare solutions in fluoro-containing solvents, preferably also ozone-friendly and also with a low GWP impact, in order to obtain solutions for coatings, wherein TTD has the formula:

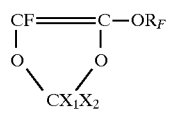

wherein $R_F$ is a perfluoroalkylic radical with 1–5 carbon atoms, linear or branched when possible; $X_1$ and $X_2$ equal to or different from each other being F or $CF_3$; the TTD amount ranges from 40 and 100% by moles; the other comonomer, in the copolymers case, is chosen from one or more of the following: tetrafluoroethylene (TFE), chlorotrifluoroethylene (CTFE), hexafluoropropene (HFP), perfluoroalkylvinylether (PAVE) of formula $CF_2=CFOR'_F$ wherein $R'_F$ is a perfluoroalkylic radical from 1 to 3 carbon atoms.

Other comonomers which can be utilized are the PDD and PD dioxoles indicated above.

The solubility in the mentioned solvents of the TTD homopolymers or its amorphous copolymers with the comonomers indicated above result to be higher than 15% by weight, in particular higher than 20% by weight, and can reach also values of 60% by weight or higher.

The copolymers can be prepared with various Tg by varying the TTD percentage. The intrinsic viscosities of the polymers generally range from 20 to 200 cc/g, preferably 40–100 cc/g, measured for instance in FLUORINERT® FC 75 (perfluoro(n-butyltetrahydrofurane)) at 25° C.

The preferred copolymers according to the present invention are the TTD copolymers with tetrafluoroethylene. The other comonomers when present are generally in amounts comprised between 0.1% by moles and 20% by moles, preferably lower than 10% by moles.

The comonomers are generally chosen so as to give preferably a Tg higher than 100° C.

Preferably the TTD amount ranges from 50 to 95% by moles. The preferred TTD is the one in which $R_F$ is equal to $CF_3$, $X_1$ and $X_2$ are equal to F. In this case among the other comonomers, also TTD can be utilized, wherein $X_1$ and $X_2$ are $CF_3$, or at least one of the two is $CF_3$.

The TTD dioxoles and the corresponding homopolymers and copolymers according to the present invention are prepared and obtained according to U.S. Pat. No. 5,498,682.

The utilizable solvents having the above characteristics are the perfluorinated ones, optionally containing ethereal oxygen in the molecule or heteroatoms such as nitrogen; perfluoropolyethers containing perfluorooxyalkylenic units and with perfluorinated end groups, optionally the terminals containing hydrogen, such as $-OCF_2H$, $-OCF(CF_3)H$, $-OCF_2CF_2H$, $-OCF(CF_2H)CF_3$.

The boiling points of the perfluoropolyether products generally range from 60° to 300° C., preferably from 80° to 160° C.

As solvents it can be cited in particular perfluoro(n-butyltetrahydrofurane), perfluoropolyethers with perfluorinated end groups, for instance GALDEN® D80 commercialized by AUSIMONT, having boiling temperature of 82° C. and number average molecular weight of 390, perfluoropolyethers wherein at least a perfluorinated end group contains an hydrogen atom.

The perfluoropolyethers are polymers containing the following units randomly distributed along the chain chosen from: $(C_3F_6O)$, $(C_2F_4O)$, $(CFXO)$ wherein X is equal to F or $CF_3$, $(CR_1R_2CF_2CF_2O)$ wherein $R_1$ equal to or different from $R_2$ is H, F, perfluoroalkyl $C_1$–$C_3$.

In particular the following perfluoropolyethers can be mentioned a) $-O(C_3F_6O)_{m'}(CFXO)_{n'}-$ wherein the unit $(C_3F_6O)$ and $(CFXO)$ are perfluorooxyalkylenic units randomly distributed along the chain; m' and n' are integers such as to give products with boiling point generally from 60° to 300° C., and m'/n' is comprised from 5 to 40, when n' is different from 0; X is equal to F or $CF_3$; n' can also be 0;

b) $-O(C_2F_4O)_{p'}(CFXO)_{q'}-(C_3F_6O)_{t'}-$ wherein p', q' and t' are integers such as to give products with boiling point indicated in a), p'/q' ranges from 5 to 0.3, preferably from 2.7–0.5; t' can be 0 and q'/(q'+p'+t') lower than or equal to 1/10 and the t'/p' ratio is from 0.2 to 6;

c) $-(CR_1R_2CF_2CF_2O)_n-$ wherein $R_1$ and $R_2$ have the meaning indicated above, and n is an integer such as to give products with boiling point indicated in a);

the end groups being chosen from $-CF_3$, $-C_2F_5$, $-C_3F_7$, $-CF_2H$, $-CFHCF_3$.

The mentioned fluoropolyethers are obtainable by the processes well known in the art, for instance see the patents U.S. Pat. No. 3,665,041, 2,242,218, 3,715,378, 4,954,271 and European patents EP 239,123, EP 148,482 and International patent application WO 95/26218.

The fluoropolyethers hydrogen-containing terminals can be prepared for example according to EP 695,775.

The perfluoropolyethers or hydrofluoropolyethers (perfluoropolyethers with perfluorinated end groups containing at least an hydrogen atom) are formed by a mixture of components having a different molecular weight with boiling points comprised in the ranges previously described.

The solutions of the homopolymers or copolymers of the present invention in the perfluorinated or perfluoropolyethereal solvents can be utilized for coatings, for example by spin coating/casting, deep coating, spraying and by brush.

Very thin films are obtained by the coating/casting spin.

As already said above, the polymers of the present invention show a combination of a high solubility in the solvents mentioned above and good mechanical properties, in particular the yield stress and the elongation at break.

The solubility limits according to the present invention have been determined by the method indicated hereinafter.

In table 2 there are reported the maximum values of solubility measured in various solvents for different amorphous polymers, obtained by copolymerizing TFE with TDD.

For maximum solubility it is meant the maximum concentration at which the polymer-solvent solution does not flow any longer when the container is overturned. This measurement is expressed with a ratio by weight by considering the polymeric weight as a percentage of the solvent weight.

The maximum solubility is measured by utilizing the following procedure: in a 50 ml glass flask equipped with stirrer, the polymeric powder and the solvent are introduced. The polymer and the solvent introduced are exactly known since they are weighed on an analytical balance having a precision up to the third decimal figure. Once the components are introduced, the flask is closed and the stirrer is turned on by a mechanical starting motor. Stirring is comprised between 10–20 rpm.

The system is stirred at room temperature until a complete solubilization of the powder is noticed. When the powder is completely dissolved, stirring is stopped and the container is overturned. If flowability is noticed, an exactly known amount of polymer is again introduced and stirring is repeated until a complete solubilization is observed. At this point stirring is stopped again and the flowability of the solution is noticed again.

It there is still flowability, one operates as previously described, otherwise the last value is considered as maximum solubility of the polymer in the solvent.

The solvents utilized in the examples are the following:

FLUORINERT® FC 75 Perfluoro(n-butyltetrahydrofurane), commercialized by 3M Company, boiling temperature ($T_{eb}$) of 103° C., molecular weight (MW) of 416;

GALDEN® D80 (Perfluoropolyether), commercialized by Ausimont, and having $T_{eb}$ of 82° C., number average molecular weight (MW) of 390 (perfluoropolyethereal structure a) with perfluoroalkylic end groups);

GALDEN H (Perfluoropolyether of the type GALDEN D80, wherein an end group is pefluorinated and the other is —CFHCF$_3$ or —CF$_2$H), the H content is of about 120 ppm, $T_{eb}$ of 110° C., number average molecular weight (MW) of 500 (perfluoropolyethereal structure a)).

The utilized dioxole in the examples is TTD 2,2,4-trifluoro-5-trifluoromethoxy-1,3-dioxole having the formula indicated above.

The following examples are given only for illustrative purposes and are not limitative of the present invention.

EXAMPLE 1

A 5 l steel AISI 316 vertical autoclave equipped with a stirrer working at 650 rpm is utilized.

After vacuum, 2960 cc of demineralized water, an aqueous microemulsion of perfluoropolyether, prepared according to example 1 of U.S. Pat. No. 4,864,006, are introduced in sequence into the autoclave, in such amount as to have 6.6 g of microemulsion/l of H$_2$O. The reactor is brought to the temperature of 75° C. and then 86.3 g of TTD/l H$_2$O (TTD initial load) are introduced and the pressure of 17 absolute bar with TFE is reached. Then 40 cc of a solution of initiator (potassium persulphate) having a concentration of 0.0925 moles/l H$_2$O are introduced. The reaction pressure is restored to the intitial value after every decrease of 0.5 bar with a semicontinuous feeding of liquid TTD and of gaseous TFE, in the ratio of 2.5 TTD/TFE by weight between the two monomers. 1036 g of TTD (the initial load excluded) are fed in total. After 450 minutes the reaction is stopped, from the reactor a latex chacterized by a content of solid of about 27% by weight, is discharged. The latex is coagulated with HNO$_3$ at a concentration of 65% by weight and dried in stove at 95° C. for 40 hours.

The so obtained white powder is utilized for all the chemical-physical measurements: glass transition temperature (Tg), intrinsic viscosity, NMR and solubility measurements. The same powder is extruded on a BRABENDER extruder, setting up a temperature on the melt product of 250° C. The obtained granules are utilized for the compression molding of the plaques utilized for the mechanical properties.

In Table 1 the chemical-physical and mechanical properties are reported; in Table 2 the solubility data in the mentioned solvents are reported.

EXAMPLES 1A and 2A (comparisons)

Example 1 is compared with the literature data relating to TEFLON AF 1600 (ex. 1A) and 2400 (ex. 2A) reported in Macromolecular Symp. 82, 61–65 (1994) for the mechanical and rheological properties (see Table 1); and with the solubility data reported in TEFLON AF—Technical Information—Properties of Amorphous Fluoropolymers Based on 2,2-Bistrifluoromethyl-4,5-Difluoro-1,3-Dioxole, W. H. Buck and P. R. Resnick, presented at the 183rd Meeting of the Electrochemical Society, Honolulu, Hi., May 17, 1993, pages 1–11 (see tab. 2). The dioxole utilized in these comparative examples is PDD 2,2 perfluoromethyl, 4,5-difluoro-1,3-dioxole.

EXAMPLE 2

One operates as for example 1 except for the following modifications:

the TTD amount initially introduced results to be of 65.3 g/l water, the polymerization pressure reached with TFE results of 14 absolute bar, the reaction pressure (14 absolute bar) is restored after every decrease of 0.5 bar by a semicontinuous feeding of liquid TTD and gaseous TFE in the ratio by weight TTD/TFE=2.58.

493 g of liquid TTD (the initial load excluded) are fed in total.

After 333 minutes the reaction is stopped and from the reactor a latex is discharged whose content in solid results of 11%. The latex is coagulated with 65% nitric acid, dried in stove at 95° C. for 40 hours.

The chemical-physical characteristics of the polymer are reported in Table 2.

EXAMPLE 3

One operates as in example 1 with the following modifications:

the amount of water introduced results to be 3276 cc, the amount of initial TTD results to be 299 g (TTD)/l (H$_2$O), the polymerization pressure reached with TFE results of 14 absolute bar, the amount of initiator introduced results to be 24 cc.

The initiator solution has the same molar concentration of that of Example 1.

the reaction pressure is maintained constant during the whole synthesis by a semicontinuous feeding of liquid TTD and gaseous TFE, in the TTD/TFE ratio=12 by weight between the two monomers.

960 g of liquid TTD (initial load excluded) are fed in total. After 170 minutes the reaction is stopped, the solid degree reached results of 7%. The polymer is coagulated with 65% HNO$_3$ and dried in stove at 100° C. for 24 hours.

EXAMPLE 4

One operates as described in example 1 except for the following modifications:

the amount of demineralized water initially introduced results to be 2672 cc, the TTD amount initially introduced results equal to 161.8 g/l water, the polymerization pressure reached with TFE results to be 12 absolute bar, the introduced initiator amount (persulphate ammonium) results to be 48 cc. The initiator solution has the same molar concentration of example 1, the reaction pressure (12 absolute bar) is restored after every decrease of 0.5 bar by a semicontinuous feeding of liquid TTD and gaseous TFE, the ratio by weight TTD/TFE=13.8 between the two monomers.

504 g of liquid TTD (the initial load excluded) are fed in total.

After 380 minutes the reaction is stopped and an amount of latex corresponding to 12% of solid is discharged.

The polymer is coagulated with 65% HNO₃ and dried in stove at 110° C. for 24 hours.

The chemical-physical characteristics of the polymer are reported in Table 2.

EXAMPLE 5

One operates as in example 1 with the following modifications:

the amount of demineralized water initially introduced results to be 2457 cc, the TTD amount initially introduced is equal to 280 g/l water, the polymerization pressure reached with TFE results to be 12 absolute bar, the initiator amount (persulphate ammonium) initially introduced results to be 43 cc. The initiator solution has the same molar concentration of that of example 1.

The reaction pressure (12 absolute bar) is restored after every decrease of 0.5 bar by a semicontinuous feeding of liquid TTD and gaseous TFE in the ratio by weight TTD/TFE=18.9 between the two monomers.

494 g of liquid TTD (the initial load excluded) are fed in total. After 500 minutes the reaction is stopped and the latex has an amount of solid corresponding to about 5%.

The polymer is coagulated with 65% HNO₃ and dried at stove at 120° C. for 24 hours.

The chemical-physical characteristics of the polymer are reported in Table 2.

TABLE 1

|  | Ex. 1 | Ex. 1A (comp.) | Ex. 2A (comp) |
|---|---|---|---|
| Tg (°C.) | 103.2 | 160 | 240 |
| Intrinsic viscosity [η] (cc/g) in FLUORINERT ® FC 75 (ASTM D 2857) | 83.5 | — | — |
| Density at 23° C. (ASTM D792) (g/cc) | 1.955 | 1.78 | 1.67 |
| Melt viscosity (Pa.s) at 250° C. at 100 s⁻¹ (ASTM D3835) | 2.6·10³ | 2.657·10³ | 540 |
| Mechanical properties at 23° C. (ASTM D1708) | | | |
| Young Modulus (MPa) | 1400 | 1549 | 1540 |
| Yield Stress (MPa) | 38 | 27.4 | 26.4 |
| Stress at break (MPa) | 29 | 26.9 | 26.4 |
| Strain at break (%) | 50 | 17.1 | 7.9 |

We claim:

1. Process for coating an article by applying solutions of amorphous perfluoropolymers to said article based on homopolymers of the TTD dioxole or its amorphous copolymers in fluoro-containing solvents, wherein TTD has the formula:

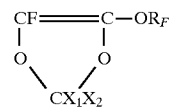

wherein $R_F$ is a perfluoroalkylic radical with 1–5 carbon atoms, linear or branched; $X_1$ and $X_2$ equal to or different from each other being F or $CF_3$; the TTD amount ranges from 40 to 100% by moles.

2. Process for coating an article by applying solutions of amorphous perfluoropolymers based on amorphous copolymers of the TTD dioxole according to claim 1, wherein one or more of the comonomers of the TTD dioxole are selected from the group consisting of: tetrafluoroethylene (TFE), chlorotrifluoroethylene (CTFE), hexafluoropropene (HFP), and perfluoroalkylvinyl-ethers (PAVE) of the formula $CF_2=CFOR'_F$ wherein $R'_F$ is a perfluoroalkylic radical from 1 to 3 carbon atoms.

3. Process for coating according to claim 2, wherein the comonomer is tetrafluoroethylene, optionally in the presence of one or more comonomers in amounts from 0.1%–20% by moles.

4. Process for coating according to claim 1, wherein in the TTD formula $R_F$ is $CF_3$ and $X_1$ and $X_2$ are fluorine.

5. Process for coating according to claim 1, wherein the amount of TTD ranges from 50% to 95% by moles.

6. Process for coating according to claims 1, wherein the solvents are chosen from the perfluorinated ones, optionally containing ethereal oxygen in the molecule or heteroatoms such as nitrogen; perfluoropolyethers containing perfluorooxyalkylenic units and having perfluorinated end groups, optionally containing hydrogen.

7. Process for coating according to claim 6, wherein the boiling point of the perfluoropolyether products ranges from 60° C. to 300° C.

8. Process for coating according to claim 7, wherein the boiling point of the perfluoropolyether products ranges from 80° C. to 160° C.

9. Process for coating according to claims 6, wherein perfluoropolyethers contain the following units randomly distributed along the chain chosen from $(C_3F_6O)$, $(C_2F_4O)$, (CFXO) wherein X is equal to F or $CF_3$, $(CR_1R_2CF_2CF_2O)$

TABLE 2

| Examples | TTD (% by moles) at NMR | Tg (°C.) | Intrinsic viscosity [η] (cc/g) in FLUORINERT FC75 | Intrinsic viscosity [η] (cc/g) in GALDEN D80 | Melt viscosity (Pa · s) at 250° C. at 100 s⁻¹ | Max sol. (% wt) in FLUORINERT FC75 | Max sol. (% by wt) in GALDEN D80 | Max sol. (% by wt) in GALDEN H |
|---|---|---|---|---|---|---|---|---|
| Example 1 | 54 | 103 | 83 | 80 | 2.6·10³ | 24 | 30 | 27 |
| Example 2 | 59 | 108 | 52 | 52 | — | 41 | 43 | 38 |
| Example 3 | 67 | 119 | — | 55 | — | 41 | 47 | 39 |
| Example 4 | 76 | 125 | — | 36 | — | 53 | 54 | 50 |
| Example 5 | 78 | 141 | — | 28 | 600 | >60 | >60 | >60 |
| Ex. 1A (comp.) TEFLON AF 1600 | 65* | 160 | — | — | — | 10–15 | — | — |
| Ex. 2A (comp.) TEFLON AF 2400 | 87* | 240 | — | — | 540 | 1.5–2 | — | — |

*of PDD wherein $R_1$ equal to or different from $R_2$ is H, F, perfluoroalkyl C1–C3.

10. Process for coating according to claim 9, wherein perfluoropolyethers are chosen from:

a) $-O(C_3F_6O)_{m'}(CFXO)_{n'}-$ wherein the unit $(C_3F_6O)$ and (CFXO) are perfluorooxyalkylenic units randomly distributed along the chain; m' and n' are integers such as to give products with boiling point generally from 60° to 300° C., and m'/n' is comprised from 5 to 40, when n' is different from 0; X is equal to F or $CF_3$; n' can also be 0;

b) $-O(C_2F_4O)_{p'}(CFXO)_{q'}(C_3F_6O)_{r'}-$ wherein p', q' and t' are integers such as to give products with boiling point indicated in a), p'/q' ranges from 5 to 0.3, preferably from 2.7–0.5; t' can be 0 and q'/(q'+p'+t') lower than or equal to 1/10 and the t'/p' ratio is from 0.2 to 6;

c) $-(CR_1R_2CF_2CF_2O)_n-$ wherein $R_1$ and $R_2$ have the meaning indicated above, and n is an integer such as to give products with boiling point indicated in a);

the end groups being chosen from $-CF_3$, $-C_2F_5$, $-C_3F_7$, $-CF_2H$, $-CFHCF_3$.

\* \* \* \* \*